Oct. 4, 1927.
P. N. TORRES
CULTIVATING IMPLEMENT
Filed Dec. 11, 1925
1,644,315
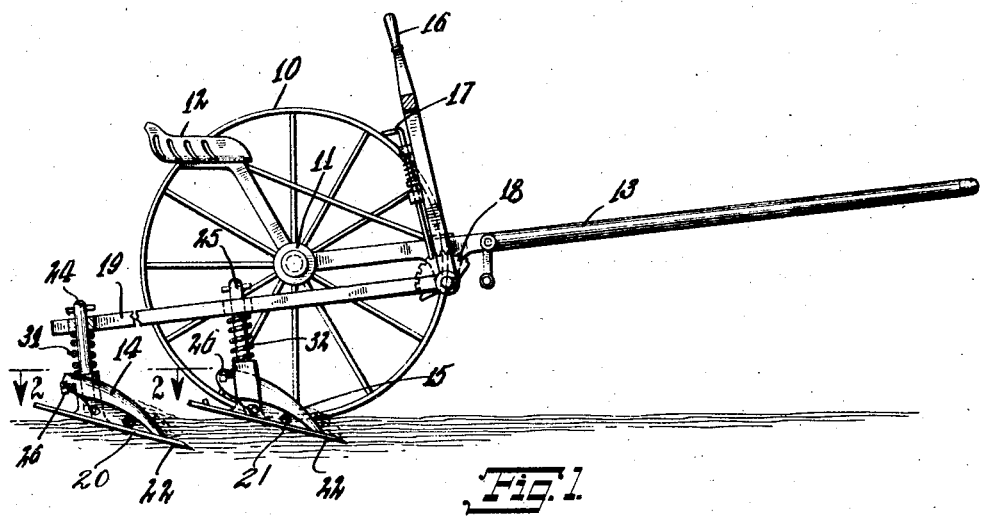
Fig. 1.
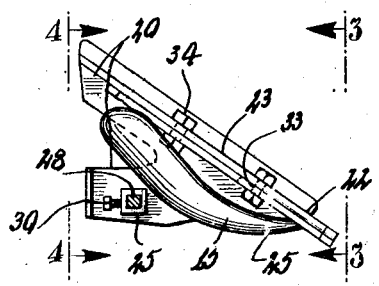
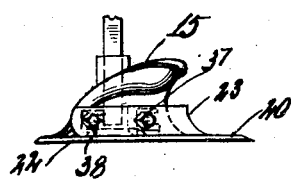
Fig. 3.
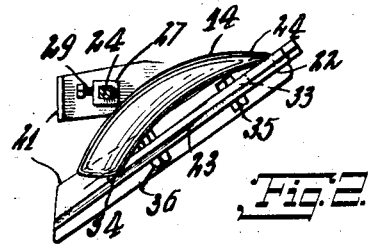
Fig. 2.
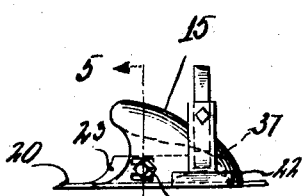
Fig. 4.
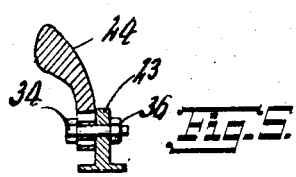
Fig. 5.
INVENTOR.
Pedro N Torres.
BY 
ATTORNEY Patented Oct. 4, 1927.

1,644,315

UNITED STATES PATENT OFFICE.

PEDRO N. TORRES, OF REALITOS, TEXAS.

CULTIVATING IMPLEMENT.

Application filed December 11, 1925. Serial No. 74,721.

This invention relates generally to agricultural implements used in preparing ground, the invention having more particular reference to a novel type of plow. The invention has for an object the provision of an improved plow which will act more efficiently in breaking up the soil.

A further object of the invention is the provision of an agricultural implement allowing an adjustment of the plow share within certain limits.

For further comprehension of the invention, and of the objects and advantages thereof, reference will be had to the following description and accompanying drawing, and to the appended claims in which the various novel features of the invention are more particularly set forth.

Fig. 1 of the drawing is a side elevational view of my improved plow.

Fig. 2 is a sectional view taken on the line 2—2 of Figure 1.

Fig. 3 is a front view of the left hand plow share, taken on the line 3—3 of Figure 2.

Fig. 4 is a rear view of the left hand plow share, taken on the line 4—4 of Figure 2.

Fig. 5 is a sectional view taken on the line 5—5 of Figure 4.

As here embodied my improved plow comprises briefly suitable wheels 10 rotatively mounted on an axle 11 and having attached thereto a seat 12 and a beam 13. As a means of raising and lowering the plow shares 14 and 15, I have provided the lever 16 with the locking rod 17 engaging with the sector 18 to which is attached the supporting rod 19.

The implement proper, according to the invention, comprises the bases 20 and 21, ending at the front into sharp contours, as designated by the number 22, on the accompanying drawing. It carries a ridge 23 to which is attached the plow shares 14 and 15, being left hand and right hand respectively. The bases 20 and 21 having a suitable means of attaching same to the vertical rods 24 and 25 respectively, such as designated by the number 26, on the accompanying drawing, and which comprises square apertures 27 and 28 to accommodate the vertical rods 24 and 25 respectively, and set screws 29 and 30 respectively, or any similar locking device. The springs 31 and 32 being provided as shown on the accompanying drawing, to allow the implement proper to accommodate itself to rocks, stones, or other immovable objects which may be encountered.

The plow shares 14 and 15 are attached to the bases 23 by means of the bolts 33 and 34 carrying nuts 35 and 36 respectively. The ridge has superposed slots 37 and 38 arranged therein in which the bolts 33 and 34 are displaced for allowing an adjustment of the plow shares 14 and 15 within certain limits in vertical direction as well as in horizontal arrangement.

As illustrated the plow shores 14 and 15 are upwardly curved to form shells, as indicated on the accompanying drawings, and are so curved as to form a left hand and right plow share, the ridges 23 on the bases 20 and 21 being at an angular position and converging at their front extremities, as shown in Figure 2 of the accompanying drawing.

It will be evident that the implement above described can effectively be used for the plowing of ground, and although I have shown my device as horse drawn, it can be operated by hand.

While I have above described the preferred form, construction and arrangement of the several elements employed, it will be understood that the device is nevertheless susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

1. A plow comprising a frame, a depending rod slidably mounted in said frame, an angular base member adjustably mounted on said depending rod comprising a substantially flat bottom member provided at its forward end with a sharpened point and a side member disposed at an inclination to said bottom member provided with communicating superimposed slots, a dished share adjustably mounted on said inclined member, and fastening means comprising bolts disposed in openings in said share adapted to extend through said slots, said bolts being adapted to be moved from one of said slots to another thereof for adjusting the position of said share relative to said base member.

2. In a plow, an angular base member comprising a substantially flat bottom member provided at its forward end with a sharpened point and an inclined side member disposed at an inclination to said bottom member provided with spaced longitudinal slots, a dished share having openings therein in registration with said slots, said share positioned with its convex surface adjacent the inclined side of said base member, and bolts extended through the opening in said share and the slots in said inclined member for adjustably securing said share to said base member, said share being adapted to be extended vertically with respect to said base member and secured in extended position by positioning the holes in said share in registration with the upper slots of said base member.

3. In a plow, an angular base member comprising a bottom member and a side member disposed at an inclination to said bottom member provided with superimposed longitudinal slots, and a share having openings therein adapted to receive bolts for adjustably attaching said share to said inclined side member, said share being adjustable longitudinally of said side member by movement of said bolts in said longitudinal slots and extensible vertically with respect to said base member by engagement of said bolts in adjacent superimposed slots.

In testimony whereof I have affixed my signature.

PEDRO N. TORRES.